No. 824,817. PATENTED JULY 3, 1906.
B. O. RHODES.
FISH BAIT OR LURE.
APPLICATION FILED OCT. 30, 1905.
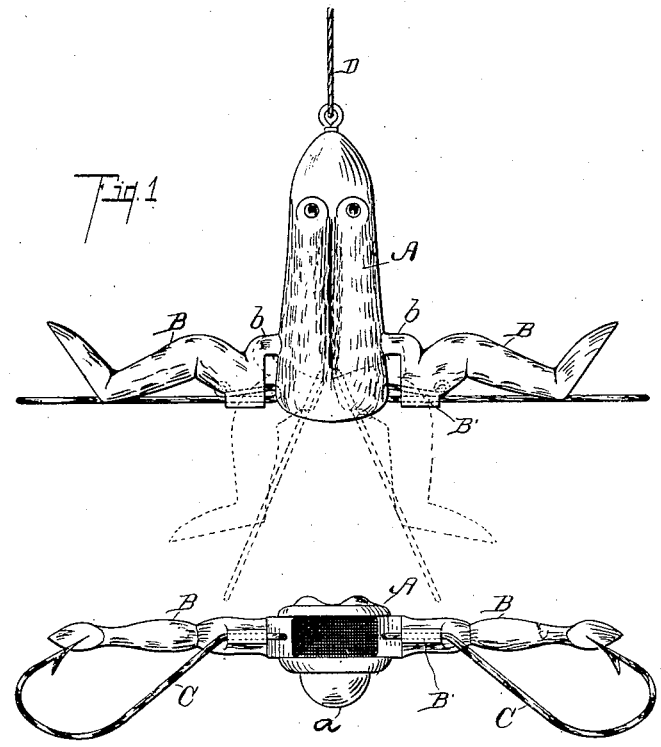
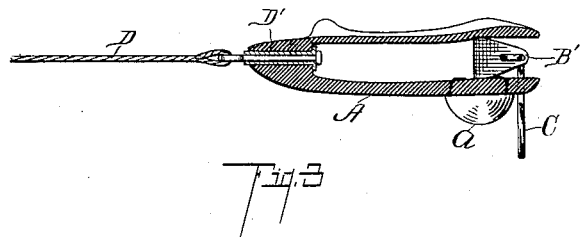
Witnesses:
Lulu Greenfield
Ethel A. Bradford
Inventor,
Bert O. Rhodes
By Chappell & Earl
Att'ys

UNITED STATES PATENT OFFICE.

BERT O. RHODES, OF KALAMAZOO, MICHIGAN, ASSIGNOR TO WILLIAM SHAKESPEARE, JR., OF KALAMAZOO, MICHIGAN.

FISH BAIT OR LURE.

No. 824,817.  Specification of Letters Patent.  Patented July 3, 1906.

Application filed October 30, 1905. Serial No. 285,030.

*To all whom it may concern:*

Be it known that I, BERT O. RHODES, a citizen of the United States, residing at Kalamazoo, in the county of Kalamazoo and State of Michigan, have invented certain new and useful Improvements in Fish Baits or Lures, of which the following is a specification.

This invention relates to improvements in fish baits or lures.

The objects of this invention are, first, to provide an improved fish bait or lure which closely resembles a natural or live bait; second, to provide such a bait which is molded or formed in one piece; third, to provide an improved artificial bait or lure which is very economical to produce.

Further objects and objects relating to structural details will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawings, forming a part of this specification, in which—

Figure 1 is a plan of my improved artificial bait or lure, the rearward position of the legs being indicated by dotted lines. Fig. 2 is a rear elevation of my improved artificial bait or lure. Fig. 3 is a central longitudinal section of my improved fish bait or lure.

In the drawings similar letters of reference refer to similar parts throughout the several views.

Referring to the drawings, the body portion A is preferably made in imitation of a frog. The leg portions B are connected to the body by hinge portions $b$, which are formed integrally therewith. The body is horizontally slotted at the rear end to allow the legs to swing inwardly, as is indicated by dotted lines in Fig. 1. The hinge portions $b$ are so arranged in forming as to hold the legs B normally forward, allowing them, however, to be swung back, as is indicated by dotted lines in Fig. 1.

I preferably cast or mold my improved bait of soft rubber, as I thus secure the desired hinging of the legs to the body, it only being necessary to reduce the leg portions at the point of their connection to the body to form the hinge. By slotting the rear end of the body horizontally, the legs are free to swing around to the rear. The body is preferably made hollow, and a weight or sinker $a$ attached to the under side thereof at the rear. By thus placing the weight the bait assumes an inclined position in the water.

When the bait is in the water, a pull upon the line, as D, which is connected to the body by a suitable swivel, as D', will throw the legs backward to the position indicated by dotted lines in Fig. 1, the pressure of the water overcoming the tension of the hinges $b$. When the line is again slackened, the tension of the hinges carries the legs forward to their normal position, thus imparting a swimming movement thereto. By a succession of pulls or jerks on the line the body is given an appearance and movement very similar to that of a swimming frog.

The hooks are carried by the legs and are so arranged that the feet lie in front of the points, thereby forming weed-guards therefor. The hooks are preferably secured to the legs by embedding therein in casting, being arranged through the projections B' on the rear side of the legs, as is illustrated. The hooks are thus carried in a position most effective to receive a strike of a fish.

My improved bait or lure is very economical to produce and is attractive in appearance. I have illustrated and described the same in form of a frog, as that is the design preferred by me. It is evident, however, that the form might be changed as desired without departing from my invention.

Having thus described my invention, what I claim as new, and desire to secure by Letters Patent, is—

1. In a bait or lure, the combination of a body portion and leg portions connected thereto by hinges formed integral therewith, the parts being molded in soft rubber, the hinge portions being arranged to hold the said movable portions yieldingly in position; and hooks carried by said leg portions, secured thereto by being embedded therein.

2. A bait or lure having integral body and leg portions formed of soft rubber, the leg portions being connected to the body portion by hinge portions arranged to hold the legs yieldingly forward.

3. A bait or lure having integral body and leg portions formed of resilient material, the legs being connected to the body by hinge portions arranged to hold said legs yieldingly forward.

4. A bait or lure having a body portion and a movable portion connected by a resilient hinge portion formed integrally therewith, the said hinge portion being arranged to hold said movable portion yieldingly in position.

5. A bait or lure having a body portion and a movable member formed of soft rubber, said movable member having a reduced portion forming a hinge connecting it to said body.

6. In a bait or lure, the combination of a body portion; a movable member; a resilient hinge for securing said movable member to said body; and a hook carried by said movable member, arranged so that said movable member serves as a guard therefor.

7. In a bait or lure, the combination of a body portion; a movable member; and a resilient hinge for securing the inner end of said movable member to said body, said hinge being arranged to hold said movable member yieldingly in position, for the purpose specified.

In witness whereof I have hereunto set my hand and seal in the presence of two witnesses.

BERT O. RHODES. [L. S.]

Witnesses:
  LULU GREENFIELD,
  OTIS A. EARL.